United States Patent
Imanari et al.

(10) Patent No.: US 11,392,114 B2
(45) Date of Patent: Jul. 19, 2022

(54) ABNORMALITY DETERMINATION SUPPORT APPARATUS

(71) Applicant: Toshiba Mitsubishi-Electric Industrial Systems Corporation, Tokyo (JP)

(72) Inventors: Hiroyuki Imanari, Tokyo (JP); Naoki Shimoda, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 16/977,476

(22) PCT Filed: Mar. 26, 2019

(86) PCT No.: PCT/JP2019/012973
§ 371 (c)(1),
(2) Date: Sep. 2, 2020

(87) PCT Pub. No.: WO2020/194534
PCT Pub. Date: Oct. 1, 2020

(65) Prior Publication Data
US 2021/0232131 A1    Jul. 29, 2021

(51) Int. Cl.
*G05B 23/02* (2006.01)
(52) U.S. Cl.
CPC ....... *G05B 23/024* (2013.01); *G05B 23/0221* (2013.01); *G05B 23/0275* (2013.01)
(58) Field of Classification Search
CPC .............. G05B 23/024; G05B 23/0221; G05B 23/0275; G05B 23/02
See application file for complete search history.

(56) References Cited

U.S. PATENT DOCUMENTS

| | | | |
|---|---|---|---|
| 2015/0100534 A1 | 4/2015 | Ohtani et al. | |
| 2018/0225166 A1* | 8/2018 | Maya | G06N 3/0454 |
| 2018/0294174 A1* | 10/2018 | Fujikata | G05B 19/058 |

FOREIGN PATENT DOCUMENTS

| EP | 3367198 A1 | 8/2018 |
|---|---|---|
| EP | 3379357 A1 | 9/2018 |

(Continued)

OTHER PUBLICATIONS

Extended European search report dated Mar. 19, 2021, in corresponding European patent Application No. 19921842.1, 8 pages.

(Continued)

*Primary Examiner* — Mischita L Henson
(74) *Attorney, Agent, or Firm* — Xsensus LLP

(57) ABSTRACT

An abnormality determination support apparatus includes an analysis object data preparation unit, a primary determination unit, and a secondary determination unit. The analysis object data preparation unit acquires a time-series signal representing at least one of a state of the manufacturing facility and a product quality from a data collection apparatus of the manufacturing facility, and extracts analysis object data from the time-series signal. The primary determination unit derives a plurality of primary determination results from common analysis object data by applying a plurality of different types of analysis methods to the analysis object data extracted by the analysis object data preparation unit. The secondary determination unit includes a machine learning device.

20 Claims, 13 Drawing Sheets

(56) References Cited

FOREIGN PATENT DOCUMENTS

| JP | 5828948 B2 | 12/2015 |
|---|---|---|
| JP | 2018-106562 A | 7/2018 |
| JP | 2019-016039 A | 1/2019 |
| JP | 2019-020278 A | 2/2019 |
| JP | 2019-028765 A | 2/2019 |
| WO | 2016/033247 A2 | 3/2016 |
| WO | 2017/109903 A1 | 6/2017 |

OTHER PUBLICATIONS

Office Action dated Oct. 27, 2021, in corresponding Korean patent Application No. 10-2020-7030237, 10 pages.
Office Action dated Dec. 10, 2021, in corresponding Indian patent Application No. 202017046507, 6 pages.
International Search Report and Written Opinion dated Jul. 2, 2019 for PCT/JP2019/012973 filed on Mar. 26, 2019, 8 pages.

* cited by examiner

Manufacturing facility

| State of signal | Loaded state | Unloaded state | Estimation of abnormal point in facility |
|---|---|---|---|
| (a1) | Large vibration | Small vibration | Determine that mechanical system is abnormal, Estimate that vibration is occurred when force is applied to machine |
| (b1) | Large vibration | Large vibration (Same level as loaded state) | Determine that electric system, signal transmission system, or control system is abnormal |
| (c1) | Small vibration | Small vibration | Determine that everything is normal |

Product quality

| State of signal | State during measurement | State of measurement waiting | Estimation of abnormal point in facility |
|---|---|---|---|
| (a2) | Large vibration | Small vibration | Determine that quality is abnormal because vibration is large in state during measurement |
| (b2) | Large vibration | Large vibration (Same level as state during measurement) | Determine that sensor system or signal transmission system is abnormal |
| (c2) | Small vibration | Small vibration | Determine that everything is normal |

FIG. 4

| >For each facility and product quality >For each absolute value and deviation | Pate width 1 | | | ... | | | Pate width TW | | |
|---|---|---|---|---|---|---|---|---|---|
| | Thickness 1 | ... | Thickness TT | Thickness 1 | ... | Thickness TT | Thickness 1 | ... | Thickness TT |
| Steel type 1 | | | | | | | | | |
| ... | | | | | | | | | |
| Steel type TS | | | | | | | | | |

(a)
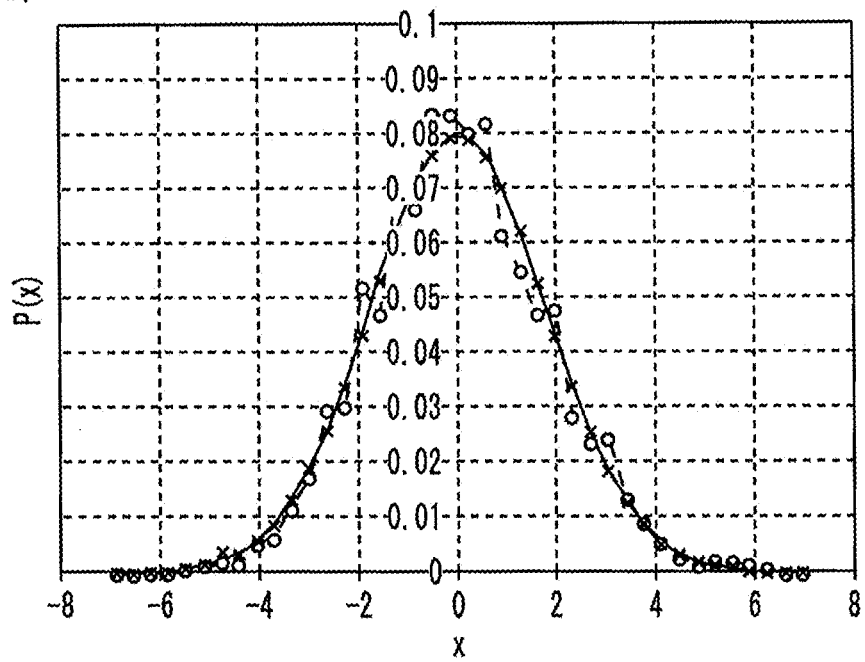
(b)
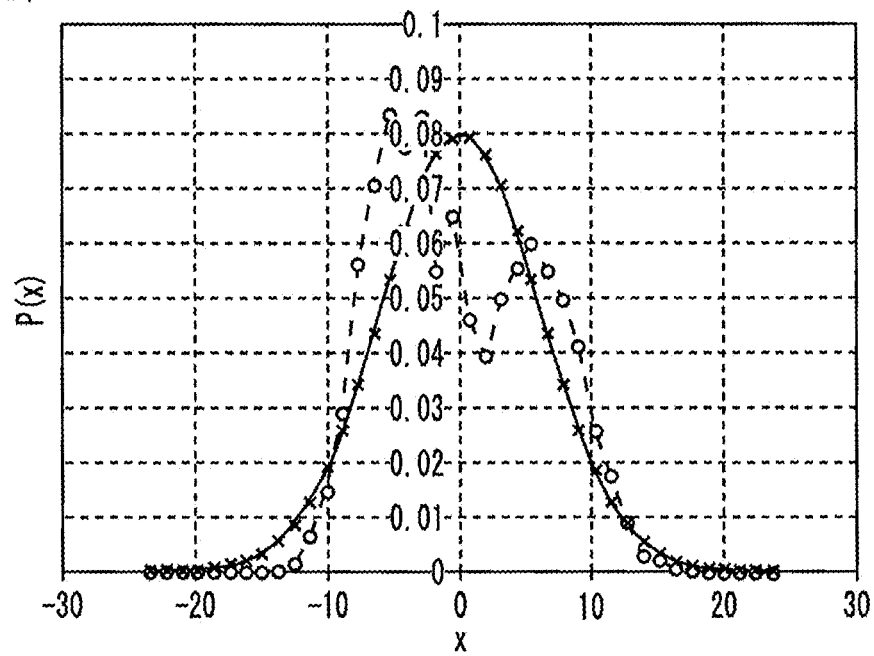
O point shows probability density distribution of actual data.
X point shows normal distribution which has the same standard deviation with the actual data.
FIG. 8

Solid line shows probability density function of local maximum value.
Broken line shows probability density function of local minimum value.

Bold line shows abnormal data.

| No. | Location | Abnormality cause-1 | Abnormality cause-2 | Countermeasure |
|---|---|---|---|---|
| 1 | Motor | Mechanical damage | 1-1 Internal mechanical damage<br>1-2 Damper bar rupture | |
| 2 | Motor | Electrical damage | 2-1 Coil damage<br>2-2 Insulation deterioration | |
| 3 | Motor | Abnormal temperature | 3-1 Abnormal temperature due to overload<br>3-2 Cooler failure | |
| 4 | Motor shaft | Shear pin damage | 4-1 Mechanical damage due to cobble<br>4-2 Welding defect | |
| 5 | Gear | Damage | 5-1 Teeth breakage<br>5-2 Abrasion, scratch | |
| 6 | Rolling bearing | Damage | 6-1 Scratch, crack, break<br>6-2 Burning<br>6-3 Abrasion<br>6-4 Electric erosion, rust | |
| 7 | Sliding bearing | Abnormal lubrication | 7-1 Oil Whirl<br>7-2 Oil whip | |
| 8 | Bearing | Damage | 8-1 Over thrust force | |
| 9 | Shaft | Misalignment | 9-1 Shaft eccentricity<br>9-2 Poor maintenance | |
| 10 | Roll | Damage | 10-1 Breakage, spalling<br>10-2 Internal defect | |
| 11 | Roll | Abnormal surface | 11-1 Abrasion<br>11-2 Black surface peering | |
| 12 | Hydraulic pressure reduction system | Abnormal pressure | 12-1 Abnormal cylinder or hydraulic pipe<br>12-2 Servo system vibration<br>12-3 Lack of source hydraulic pressure, oil leak | |
| 13 | | | | |
| 14 | | | | |

FIG. 13

ABNORMALITY DETERMINATION SUPPORT APPARATUS

CROSS-REFERENCE TO RELATED APPLICATION

The present application is based on PCT filing PCT/JP2019/012973, filed Mar. 26, 2019, the entire contents of which are incorporated herein by reference.

TECHNICAL FIELD

The present disclosure relates to an abnormality determination support apparatus for a manufacturing facility that manufactures a product, the abnormality determination support apparatus supporting in determining whether the manufacturing facility itself and/or quality of the product is normal or abnormal.

BACKGROUND ART

Many manufacturing facilities such as a rolling mill, a processing machine, and an assembling machine are used in the manufacturing industry. For example, the rolling mill for manufacturing a plate material is a facility that rolls and thins a mass of steel material or non-ferrous material such as aluminum or copper to facilitate processing of the material into an automobile or an electrical appliance. The rolling mill is equipped with, for example, two roughing rolling stands and seven finishing rolling stands. In many cases, the configurations of devices such as a large capacity electric motor for driving upper and lower rolling rolls, and a shaft connecting the rolls and the electric motor are similar although the detailed specifications are different.

These manufacturing facilities are strongly demanded to manufacture products stably and at high speed. Therefore, a technique for notifying in advance of a defect or an abnormality of the manufacturing facilities is needed in order to avoid production obstruction due to a failure of the manufacturing facilities. Collecting a signal of an object facility and determining normality/abnormality from the signal is a common practice of the technique. As publicly known documents relating to such a technique, the following Patent Documents 1, 2, and 3 can be exemplified.

Patent Document 1 describes a method of identifying the presence or absence of an abnormality by using two indices based on the amplitude of a current of a rotating machine. According to the method described in Patent Document 1, the presence or absence of an abnormality is determined based on whether or not one index has exceeded a preset determination criterion. However, Patent Document 1 does not mention strengthening of determination ability using a learning method such as machine learning.

Patent Document 2 describes a method of diagnosing an abnormality using a current of a rotating machine. However, as in Patent Document 1, the diagnostic method is to determine whether or not a certain index exceeds a threshold value. In addition, although there is a description that machine learning can be applied, there is no mention about specific methods.

Patent Document 3 describes that a model to be diagnosed is prepared in advance by regression analysis using data obtained in normal operation, and the difference between the model prepared from the data obtained in normal operation and a model prepared from current data is evaluated to determine whether or not an abnormality occurs. The method described in Patent Document 3 is also a method of determining whether or not an abnormality occurs based on whether or not one index exceeds a predetermined threshold value.

One of the most challenging things in determining normality/abnormality is the problem of how to set the boundary between normality and abnormality, i.e., the threshold value for determining normality/abnormality. Depending on the setting of the threshold value, it may be determined that the normal state is abnormal, or it may be determined that the abnormal state is normal. A determination result of normality/abnormality depends on the threshold value, and may change by changing the threshold value thereafter.

In addition, several analysis methods have been used to determine normality/abnormality. For example, basic statistics (an average, a maximum/minimum, a standard deviation, a skewness, a kurtosis, etc.) and recognition of the type of probability density function are used. Quantification of the relationship between a width (amplitude) and frequency of vibration is also performed by using fast Fourier transform (FFT) or wavelet transform However, since there are a plurality of analysis methods as above, a determination result cannot be uniquely determined. In addition, the determination result cannot be uniquely determined depending on how to determine the threshold value. For example, a determination result of being normal may be obtained based on an index output by one analysis method and a threshold value set for the index, but the determination result may change from normality to abnormality under an index output by another analysis method and a threshold value set for the index.

In general, the number and type of abnormal data is much less than the number and type of normal data. Therefore, it takes a long time to collect cases indicating that the data is abnormal.

PRIOR-ART DOCUMENT

Patent Document

[Patent Document 1] Japanese Patent No. 5828948
[Patent Document 2] Japanese Patent Application Laid-Open No. 2019-020278
[Patent Document 3] Japanese Patent Application Laid-Open No. 2019-016039

SUMMARY OF DISCLOSURE

Technical Problem

The present disclosure has been made in view of the above problems, and an object thereof is to provide an abnormality determination support apparatus that supports accurate determination of whether an abnormality has occurred in a manufacturing facility.

Solution to Problem

The abnormality determination support apparatus according to the present disclosure is an abnormality determination support apparatus that provides determination information for determining whether an abnormality has occurred in a manufacturing facility, and includes an analysis object data preparation unit, a primary determination unit, and a secondary determination unit. The analysis object data preparation unit is configured to acquire a time-series signal representing at least one of a state of the manufacturing facility and a product quality from a data collection apparatus of the manufacturing facility, and extract analysis object data from the time-series signal. The primary determination unit is configured to derive a plurality of primary determination results from common analysis object data by applying a plurality of different types of analysis methods to the analysis object data extracted by the analysis object data preparation unit. The secondary determination unit includes a machine learning device which is learned using a teacher signal which is a pair of a primary determination result obtained by the primary determination unit and a corresponding set of an abnormality determination result and an abnormality cause, which is a correct answer, and is configured to input a plurality of primary determination results obtained from common analysis object data in the primary determination unit to the machine learning device, and output a secondary determination result and estimated abnormality cause output from the machine learning device as the determination information.

The processes of the analysis object data preparation unit, the primary determination unit, and the secondary determination unit may be executed by the computer constituting the abnormality determination support apparatus. In other words, the abnormality determination support apparatus may be configured by a computer including at least one processor and at least one memory that stores at least one program, and the at least one program may be configured such that the at least one processor operates as the analysis object data preparation unit, the primary determination unit, and the secondary determination unit when the at least one program read from the at least one memory is executed by the at least one processor.

In one embodiment of the abnormality determination support apparatus according to the present disclosure, the primary determination unit may be configured to convert the analysis object data into a plurality of numerical indices by applying a plurality of different types of analysis methods to the analysis object data, and output the plurality of numerical indices as the plurality of primary determination results. The machine learning device may be configured to be learned using a teacher signal including the numerical index obtained by the primary determination unit as an input and including an actual abnormality determination result and an actual abnormality cause as a correct answer. The secondary determination unit may be configured to input the plurality of numerical indices obtained for each analysis method by the primary determination unit to the machine learning device, and output the abnormality determination result and the estimated abnormality cause output from the machine learning device as the determination information.

In another embodiment of the abnormality determination support apparatus according to the present disclosure, the primary determination unit may be configured to convert the analysis object data into a plurality of numerical indices by applying a plurality of different types of analysis methods to the analysis object data, perform determination of presence or absence of an abnormality and calculation of an abnormality degree based on each of the plurality of numerical indices, and output a plurality of determination results and abnormality degrees obtained for each analysis method as a plurality of primary determination results. The machine learning device may be configured to be learned using a teacher signal including the determination result and the abnormality degree obtained by the primary determination unit as an input and including an actual abnormality determination result and an actual abnormality cause as a correct answer. The secondary determination unit may be configured to input the plurality of determination results and the abnormality degrees obtained for each analysis method by the primary determination unit to the machine learning device, and output the abnormality determination result and the estimated abnormality cause output from the machine learning device as the determination information.

In still another embodiment of the abnormality determination support apparatus according to the present disclosure, the primary determination unit may be configured to convert the analysis object data into a plurality of numerical indices by applying a plurality of different types of analysis methods to the analysis object data, and output the plurality of numerical indices as a plurality of primary determination results. The machine learning device may be configured to be learned using a teacher signal including the numerical index obtained by the primary determination unit as an input and including the presence or absence of an abnormality determined from the numerical index and the abnormality degree calculated from the numerical index as a correct answer. The secondary determination unit may be configured to input the plurality of numerical indices obtained for each analysis method by the primary determination unit to the machine learning device, and output the abnormality determination result and the estimated abnormality cause output from the machine learning device as the determination information.

In the abnormality determination support apparatus according to the present disclosure, the analysis object data preparation unit may be configured to extract data in two states of a loaded state and an unloaded state of the manufacturing facility while the manufacturing facility is in operation, and calculate a high-frequency component obtained by removing a low-frequency component from the extracted data as the analysis object data. In this case, the primary determination unit may be configured to convert the analysis object data into a plurality of numerical indices by applying a plurality of different analysis methods to the analysis object data in each of the loaded state and the unloaded state, determine the presence or absence of an abnormality based on each of the plurality of numerical indices, determine that there is an abnormality in the mechanical system if the loaded state is an abnormal state and the unloaded state is a normal state, and determine that there is an abnormality in any one of the electrical system, the signal transmission system, and the control system if both the loaded state and the unloaded state are abnormal states.

Further, in the abnormality determination support apparatus according to the present disclosure, the analysis object data preparation unit may be configured to extract data in two states of the sensor for measuring product quality, which are a state during measurement and a state of measurement waiting, during operation of the manufacturing facility, and further calculate a high-frequency component obtained by removing a low-frequency component from the extracted data as the analysis object data. In this case, the primary determination unit may be configured to convert the analysis object data into a plurality of numerical indices by applying a plurality of different analysis methods to the analysis object data in each of the state during measurement and the state of measurement waiting, determine the presence or absence of an abnormality based on each of the plurality of numerical indices, determine that there is an abnormality in the product quality if the state during measurement is an abnormal state and the state of measurement waiting is a normal state, and determine that there is an abnormality in a sensor system that measures the product quality or an a signal transmission systems if both the state during measurement and the state of measurement waiting are abnormal states.

In the abnormality determination support apparatus according to the present disclosure, the machine learning device may be configured to perform learning by any one of learning by a neural network having one intermediate layer, deep learning by a neural network having a plurality of intermediate layers, and rule-based learning.

In the abnormality determination support apparatus according to the present disclosure, the machine learning device may be configured such that a dimensionless variable having no physical unit among the variables indicating the primary determination result obtained by the primary determination unit is set as a learning object, and the dimensionless variable is applied to transition learning to the abnormality determination support apparatus of another manufacturing facility or transition learning from the abnormality determination support apparatus of another manufacturing facility.

The abnormality determination support apparatus according to the present disclosure may further comprise a data and result storage unit and a display unit. The data and result storage unit is configured to store, for example, at least one of the analysis object data prepared by the analysis object data preparation unit, determination progress and result by the primary determination unit, and determination progress and result by the secondary determination unit in the recording device. The display unit is configured to visually display at least one of the time-series signal obtained from the data collection apparatus, the analysis object data prepared by the analysis object data preparation unit, determination progress and result by the primary determination unit, and determination progress and result by the secondary determination unit.

Effect of Disclosure

According to the abnormality determination support apparatus according to the present disclosure, in addition to the primary determination result obtained by the primary determination unit, the secondary determination result and the estimated abnormality cause by the secondary determination unit are obtained. The secondary determination unit obtains the secondary determination result and the estimated abnormality cause by inputting a plurality of primary determination results obtained by the primary determination unit to the machine learning device, and thereby can make a highly accurate determination independent of the analysis method and the threshold value. Thus, accurate determination of whether or not an abnormality has occurred in a manufacturing facility is supported by the abnormality determination support apparatus of the present disclosure.

BRIEF DESCRIPTION OF DRAWINGS

FIG. 4 is a table for explaining correspondence between a state of a signal of a numerical index and an estimated abnormal point in the facility.

FIG. 8 is a diagram illustrating a probability density distribution according to the embodiment of the present disclosure.

FIG. 13 is a diagram for explaining an example of a learning mode in the machine learning device according to the embodiment of the present disclosure.

DESCRIPTION OF EMBODIMENTS

Embodiments of the present disclosure will be described with reference to the drawings. However, the following embodiments exemplify apparatuses and methods for embodying the technical idea of the present disclosure, and the structure and arrangement of the constituent parts, processing order, and the like are not intended to be limited to those described below, except when specifically stated. The present disclosure is not limited to the following embodiments, and various modifications can be made without departing from the spirit of the present disclosure.

1. Example of System of Manufacturing Facility

Figure 1:
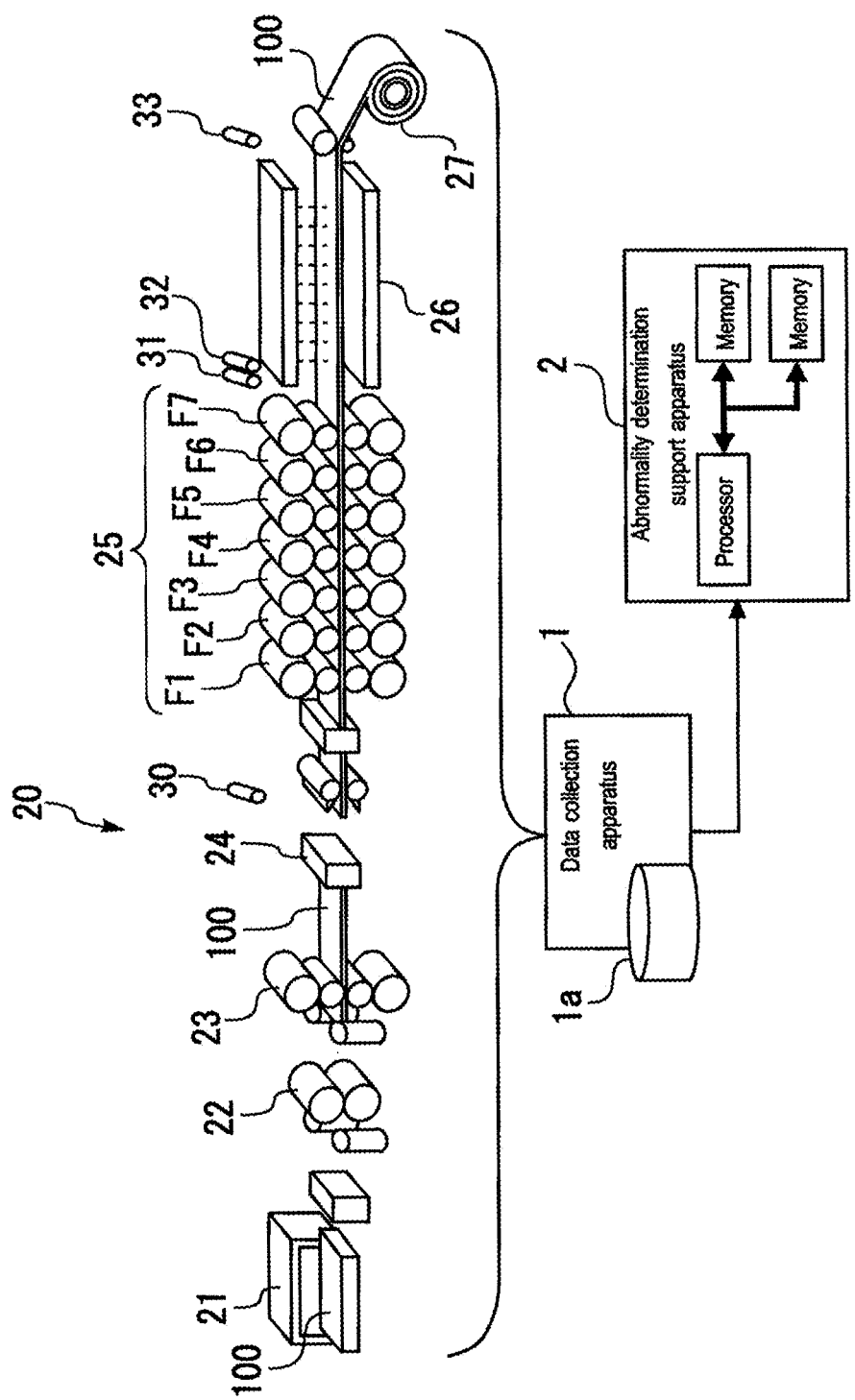
FIG. 1 is a diagram showing an example of a system of a manufacturing facility to which an abnormality determination support apparatus according to an embodiment of the present disclosure is applied.

FIG. 1 is a diagram showing an example of a system of a manufacturing facility to which an abnormality determination support apparatus according to the embodiment of the present disclosure is applied. The manufacturing facility 20 to which the abnormality determination support apparatus 2 is applied in the present embodiment is a hot strip rolling line. The hot strip rolling line is a manufacturing facility 20 composed of various apparatuses such as a heating furnace 21, a roughing rolling mill 22, 23, a bar heater 24, a finishing rolling mill 25, a run-out table 26, and a coiler 27.

A material-to-be-rolled 100 heated by the heating furnace 21 is rolled by the roughing rolling mill 22, 23. The material 100 rolled by the roughing rolling mill 22, 23 is conveyed to the finishing rolling mill 25 via the bar heater 24. The finishing rolling mill 25 has seven rolling stands F1 to F7 arranged in series, and rolls the material 100 to a desired strip thickness. The material 100 rolled by the finish rolling mill 25 is cooled by the run-out table 26, and then coiled into a coil shape by the coiler 27. A coiled thin strip formed by thinly rolling the material 100 is a final product produced by the manufacturing facility 20.

Various sensors for measuring physical quantities related to product quality are arranged in the manufacturing facility 20. For example, a pyrometer 30 for measuring the temperature on the entrance side of the finishing rolling mill 25, a sensor 31 for measuring the strip thickness and the strip width, a pyrometer 32 for measuring the temperature on the exit side of the finishing rolling mill 25, a pyrometer 33 for measuring the temperature on the entrance side of the coiler 27, and the like are arranged.

The manufacturing facility 20 is equipped with a data collection apparatus 1. In order to ensure or manage the quality of the product, the data collection apparatus 1 continuously or intermittently collects various data such as set values and actual values for each apparatus constituting the manufacturing facility 20, measured values by each sensor 30 to 33 disposed in the manufacturing facility 20, and manipulated variables for operating each apparatus properly, and records the data on a recording apparatus 1a such as a hard disk. The data collection apparatus 1 may be configured by a single computer or a plurality of computers connected to a network.

2. Outline of Abnormality Determination Support Apparatus

The abnormality determination support apparatus 2 is connected to the data collection apparatus 1 by a LAN, for example. The abnormality determination support apparatus 2 is a device that supports a user with an abnormality determination for the manufacturing facility 20. More specifically, the abnormality determination support apparatus 2 is a device for providing the user with determination information for determining whether an abnormality has occurred in the manufacturing facility 20. The abnormality determination support apparatus 2 supports the user with the abnormality determination by extracting the analysis object data used for the abnormality determination for the manufacturing facility 20 from the time-series signal recorded in the data collection apparatus 1, analyzing the extracted data, and providing the analysis result to the user. The abnormality determination support apparatus 2 is a computer having at least one memory and at least one processor. Various programs and various data used for the abnormality determination are stored in the memory.

Figure 2:
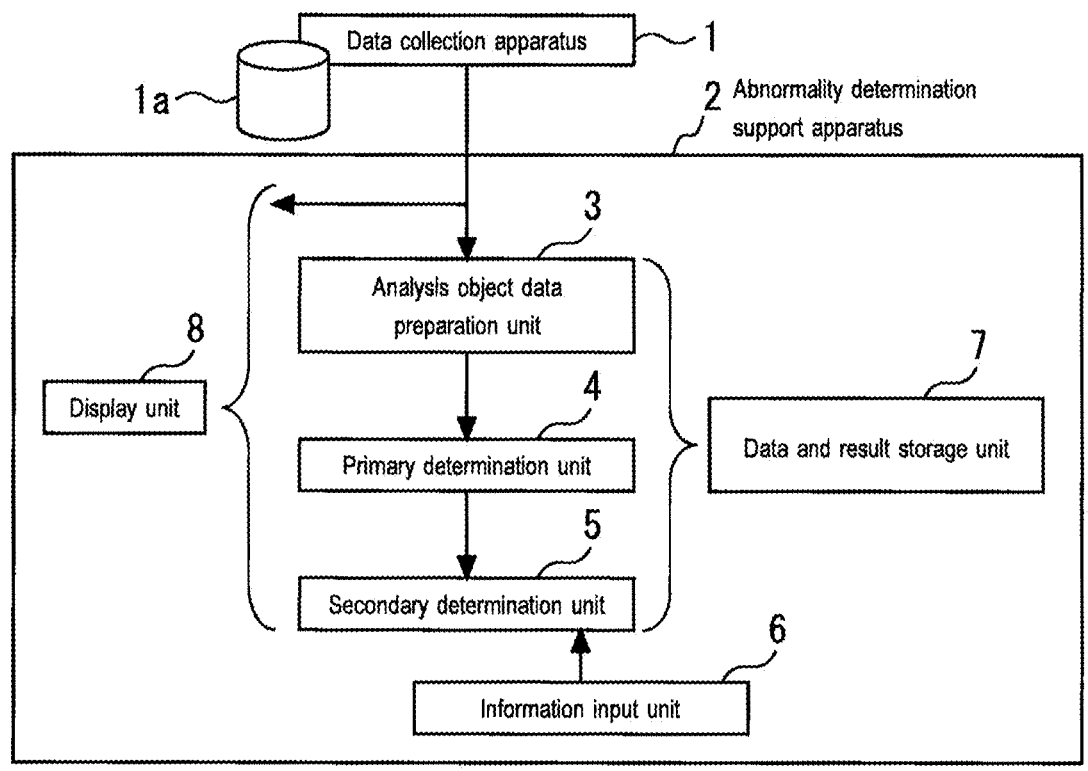
FIG. 2 is a block diagram showing a configuration of the abnormality determination support apparatus according to the embodiment of the present disclosure.

FIG. 2 is a diagram showing a configuration of the abnormality determination support apparatus 2. Functions of the abnormality determination support apparatus 2 are represented by blocks in FIG. 2. The abnormality determination support apparatus 2 includes an analysis object data preparation unit 3, a primary determination unit 4, a secondary determination unit 5, an information input unit 6, a data and result storage unit 7, and a display unit 8. Among these units, the analysis object data preparation unit 3, the primary determination unit 4, and the secondary determination unit 5 are software, and are realized by the processor executing a program read from the memory. On the other hand, the information input unit 6, the data and result storage unit 7, and the display unit 8 may be provided separately from the abnormality determination support apparatus 2. The information input unit 6 is, for example, a keyboard, the data and result storage unit 7 is, for example, a recording device such as a hard disk, and the display unit 8 is, for example, a display monitor.

3. Functions of the Abnormality Determination Support Apparatus 3-1. Analysis Object Data Preparation Unit The analysis object data preparation unit 3 acquires a time-series signal representing the state of the manufacturing facility 20 such as a vibration, a current, a load, and the like and a time-series signal representing the product quality from the data collection apparatus 1, and extracts data necessary for analysis and determination performed by the primary determination unit 4 from the time-series signal. However, since the information as to whether the manufacturing facility 20 is abnormal or normal is not obtained if the manufacturing facility 20 is not operating, the analysis object data preparation unit 3 extracts the data obtained when the manufacturing facility 20 is operating from the time-series signal.

In addition, even during the operation of the manufacturing facility 20, for example, there is a difference in the behavior of the signals in the abnormal time between a state during rolling in the rolling facility, that is, a state in which a load is applied (loaded state) and a state in which rolling is not performed, that is, a state in which a load is not applied (unloaded state). Therefore, the analysis object data preparation unit 3 extracts data in two states, a loaded state and an unloaded state. In addition, concerning the sensors 30 to 33 for measuring the product quality, data of the sensors 30 to 33 in two states, which are a state during measurement and a state of measurement waiting, are extracted during the operation of the manufacturing facility 20.

The analysis object data preparation unit 3 transmits all data extracted from the time-series signal to the primary determination unit 4. At this time, the data can be processed so as to be a signal suitable for analysis or determination by the primary determination unit 4. For example, the analysis object data preparation unit 3 can calculate a high-frequency component obtained by excluding a low-frequency component from the value of the extracted data itself, i.e., a deviation from the low-frequency component. The signal in the loaded state is generally a large value, whereas the signal in the unloaded state is a small value. The magnitude of the signal in the loaded state is more significant than that in the unloaded state, therefore the state of facility and/or quality in the unloaded state is difficult to extract. In order to compare the signal in the loaded state and the signal in the unloaded state on the same basis, it is preferable to extract the high-frequency component. The same applies to the relationship between a signal of the sensor in the state during measurement and a signal thereof in the state of measurement waiting. Other than the processing of extracting the high-frequency component as described above, processing of reducing noise by applying a low-pass filter to the extracted data can be applied.

Figure 3:
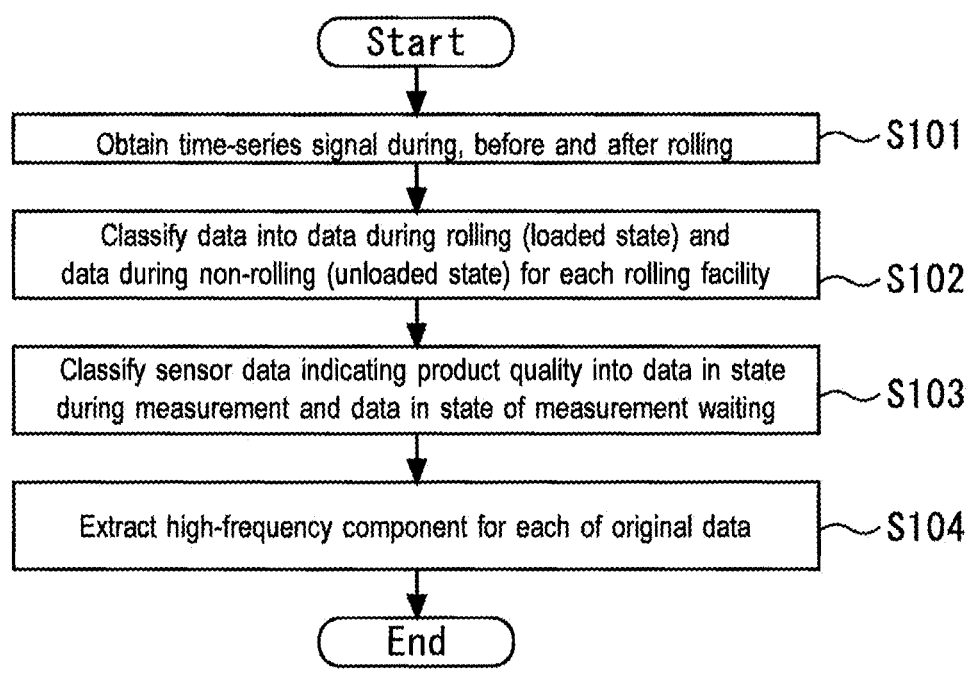
FIG. 3 is a diagram for explaining an example of a processing flow of an analysis object data preparation unit according to the embodiment of the present disclosure.

FIG. 3 is a diagram for explaining an example of a processing flow of the analysis object data preparation unit 3. In step S101, when the rolling of the material-to-be-rolled, which is to be analyzed, is completed in the manufacturing facility 20, the time-series signal during, before and after the rolling is obtained from the data collection apparatus 1. The time-series signal includes data representing the state of the manufacturing facility 20 and sensor data representing the product quality.

In step S102, for each rolling facility (seven rolling stands constituting a finishing rolling mill and two rolling stands constituting a roughing rolling mill), the data such as a rolling load, a rolling torque, an electric motor current, and a rotating machine speed is classified into the data during rolling (loaded state) and the data during non-rolling (unloaded state). In step S103, the sensor data such as a strip thickness and a strip width indicating the product quality is classified into the data in the state during measurement and the data in the state of measurement waiting.

In step S104, a high-frequency component is extracted for each of the original data of steps S102 and S103. For example, the high-frequency component can be extracted by directly applying a high-pass filter to the original data. Alternatively, the high-frequency component may be extracted by processing the original data by a low-pass filter and subtracting the output result of the low-pass filter from the original data. In the present specification, the high-frequency component may be referred to as deviation data, and the original data before the high-frequency component is extracted may be referred to as absolute value data with respect to the deviation data. In the present specification, the original data means direct data obtained from a manufacturing facility such as a current of an electric motor and a rolling load. The data to be analyzed includes both the original data and the deviation data. In addition to the absolute value data, the original data also includes data converted into deviation data in a sensor or the like. In addition to passing the deviation data as the high-frequency component to the primary determination unit 4, the analysis object data preparation unit 3 can pass all data required in the primary determination, such as the absolute value data as the original data and the data obtained by applying a low-pass filter to the original data to reduce noise, to the primary determination unit 4.

3-2. Primary Determination Unit

The primary determination unit 4 applies a plurality of different analysis methods to the analysis object data classified into the loaded state and the unloaded state, or the state during measurement and the state of measurement waiting in the analysis object data preparation unit 3. Specifically, the primary determination unit 4 converts the analysis object data into as many determination-suitable numerical indices as the number of analysis methods by applying a plurality of different analysis methods to common analysis object data. Further, the primary determination unit 4 performs determination of an abnormality and calculate of an abnormality degree of the manufacturing facility 20 based on each of the plurality of numerical indices, and performs determination of an abnormality and calculation of an abnormality degree of the product quality.

The primary determination unit 4 determines the abnormality based on the characteristic of the signal of the numerical index. As the characteristic of the signal of the numerical index for determining the abnormality, the vibration state of the signal of the numerical index can be cited as an example. When the vibration of the signal of the numerical index is large, it can be determined as the abnormality, and when the vibration of the signal of the numerical index is small, it can be determined as the normality. Further, by combining the determination based on the characteristic of the signal in the loaded state and the determination based on the characteristic of the signal in the unloaded state, it is possible to estimate the abnormal point in the facility.

FIG. 4 is a table for explaining correspondence between the state of the signal of the numerical index and the estimated abnormal point in the facility. In the case of the signal of the numerical index relating to the state of the manufacturing facility, the state of the signal includes patterns a1, b1, and c1 shown in the table. When the state of the signal is a1, that is, when the vibration is large (i.e., abnormal) in the loaded state and small (i.e., normal) in the unloaded state, it can be determined that the mechanical system is abnormal. When the state of the signal is b1, that is, when the vibration is large in the loaded state and the vibration is large in the unloaded state too, it can be determined that the electric system, the signal transmission system, or the control system is abnormal. When the state of the signal is c1, that is, when the vibration is small in the loaded state and small in the unloaded state too, it can be determined that the facility is normal.

In the case of the signal of the numerical index relating to the product quality, the state of the signal includes patterns a2, b2, and c2 shown in the table. When the state of the signal is a2, that is, when the vibration is large (i.e., abnormal) in the state during measurement and small (i.e., normal) in the state of measurement waiting, it can be determined that the quality is abnormal. When the state of the signal is b2, that is, when the vibration is large in the state during measurement and large in the state of measurement waiting too, it can be determined that the sensor system is abnormal or the signal transmission system is abnormal. When the state of the signal is c2, that is, when the vibration is small in the state during measurement and small in the state of measurement waiting too, it can be determined that the product quality is normal.

The primary determination unit 4 outputs the numerical index, and/or, the abnormality determination result and the abnormality degree obtained by the above-described processing to the secondary determination unit 5 as the primary determination result.

Figure 5:
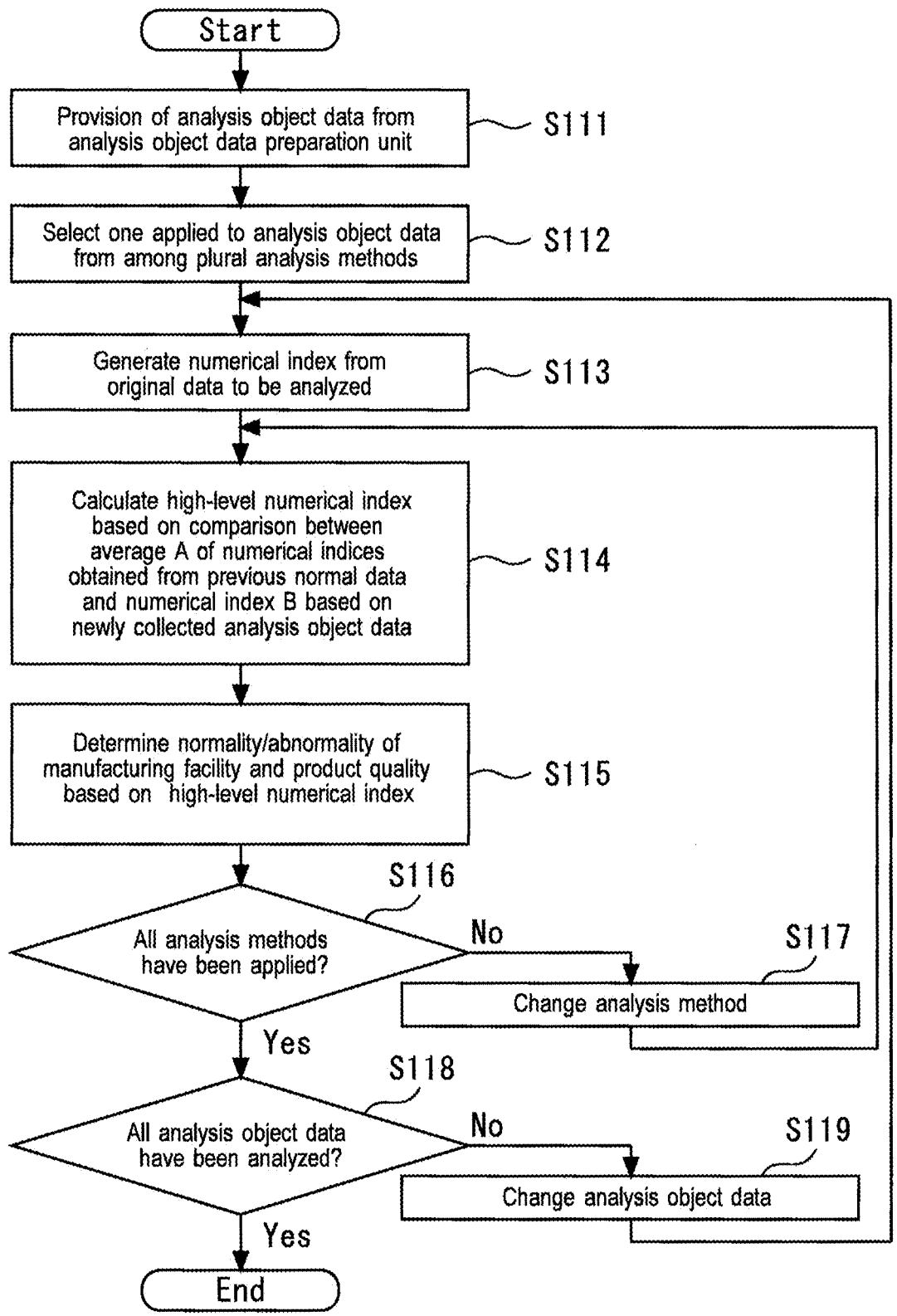
FIG. 5 is a diagram for explaining an example of a processing flow of a primary determination unit according to the embodiment of the present disclosure.

FIG. 5 is a diagram for explaining an example of a processing flow of the primary determination unit 4. First, in step S111, the analysis object data is provided from the analysis object data preparation unit 3. The analysis object data is prepared for each rolling facility (including loaded state and unloaded state), each product quality (including state during measurement and state of measurement waiting), and each data type (that is, absolute value data or deviation data). The primary determination unit 4 sorts the analysis object data so as to cover all cases, for example, the first stand-rolling load-loaded state-deviation data, and the seventh stand-motor current-unloaded state-absolute value data.

In step S112, one analysis method to be applied to the analysis object data is selected from among plural types of different analysis methods. The details of the analysis method will be described later. Here, for example, a method of obtaining the standard deviation of the analysis object data is selected, and the method is applied to the first stand-rolling load-loaded state-deviation data.

In step S113, the numerical index is generated from the original data (absolute value data) to be analyzed. For example, the standard deviation is calculated from the original data to be analyzed, and this is used as the numerical index. As another example, the probability density distribution is calculated from the original data to be analyzed, and the difference from the normal distribution based on the data is evaluated by Kullback-Leibler Divergence or the like, and the difference is used as the numerical index.

In step S114, the average A of the m numerical indices obtained from the previous normal data is compared with the numerical index B based on the newly collected analysis object data. Then, a difference between A and B is calculated as a high-level numerical index. Hotelling's theory may be applied to calculation of the high-level numerical index. Details of how to obtain the numerical index will also be described later.

In step S115, the normality/abnormality of the manufacturing facility and the product quality is determined based on the high-level numerical index calculated in step S114. For example, the numerical index based on Hotelling's theory is applied to chi-square distributions to determine the abnormality degree (abnormality possibility). The display unit 8 described later displays, for example, a red alarm if the abnormality degree is 99% or more, a yellow alarm if the abnormality degree is 95% or more, and a gradation color from red to yellow if the abnormality degree is in the middle.

In step S116, if all the analysis methods to be applied have been applied, the process proceeds to step S118, and if not, the analysis method is changed in step S117. In step S118, if all the analysis object data have been analyzed, the process is terminated, and if not, the analysis object data is changed in step S119.

3-2-1. First Example of Analysis Method

As a first example of the analysis method, a method of calculating a statistic will be described. Statistics include the following. Here, it is assumed that a data group X of n pieces of original data represented by following Equation 1 are obtained.

$$X = \{x_1, x_2, \ldots, x_i, \ldots, x_n\} \quad \text{Equation 1}$$

Typical statistics that can be calculated from the original data include the following. These are described, for example, in a general literature such as "Ensuring Machine Maintenance in FY2017 Version (Facility Diagnosis Work): The Management Center of the Japan Efficiency Society".

(1) Average Value $$\bar{x} = \frac{1}{n} \sum_{i=1}^{n} x_i$$

(2) Average Absolute Value $$\bar{x}_{abs} = \frac{1}{n} \sum_{i=1}^{n} |x_i|$$

(3) Standard Deviation $$\sigma = \sqrt{\frac{1}{n-1} \sum_{i=1}^{n} (x_i - \bar{x})^2}$$

This statistic shows the magnitude of a vibration.

(4) Effective Value $$x_{rms} = \sqrt{\frac{1}{n} \sum_{i=1}^{n} x_i^2}$$

If the average value is 0, this statistic is the same as the standard deviation.

(5) Peak Value

For example, this statistic may be the average value of 10 values in descending order from a maximum positive value, or the average value of 10 values in descending order from a minimum negative value.

(6) Shape Factor $$S_f = \frac{x_{rms}}{\bar{x}_{abs}}$$

This statistic indicates unbalance and misalignment in a low-frequency region.

(7) Crest Factor $$C_f = \frac{x_p}{x_{rms}}$$

This statistic is used to determine an abnormality in a bearing or a gear.

(8) Impulse Factor $$I_f = \frac{x_p}{\bar{x}}$$

This statistic is used to diagnose a local defect in a bearing or a gear and to diagnose a reciprocating engine.

(9) Clearance Factor $$L = \frac{x_p}{(x_{rms})^2}$$

This statistic is used to detect a micro local defect.

(10) Skewness $$\beta_1 = \frac{1}{\sigma^3} \frac{\sum_{i=1}^{n} (x_i - \bar{x})^3}{n-1}$$

This statistic is an index showing the asymmetry of a distribution.

(11) Kurtosis $$\beta_2 = \frac{1}{\sigma^4} \frac{\sum_{i=1}^{n} (x_i - \bar{x})^4}{n-1} - 3$$

This statistic is used to diagnose a bearing, a gear, and a rotating machine.

Among the above statistics, dimensionless variables, which do not have physical units such as mm or kg, are (6) shape factor, (7) crest factor, (8) impulse factor, (10) skewness, and (11) kurtosis.

A method of calculating the standard deviation will be described as a method of analyzing the original data. The past data accumulation table for accumulating m normal numerical indices in the past (e.g., m=50, 100, etc.) can be of the form shown in FIG. 6. This table has a table for each facility and product quality, and for each absolute value and deviation of the original data, and has classifications including steel type classification (TS), strip thickness classification (TT), and strip width classification (TW) (for example, TS=100, TT=30, TW=10, etc.). Of course, these classifications may be made finer, or unnecessary classifications may be omitted.

Each cell of the table is provided with m storage areas. The standard deviation calculated from the normal data is stored therein as a normal numerical index. The numerical indices for the past m are extracted from the cells of the same steel type, the same strip thickness, and the same strip width as the newly collected analysis object data. Then, the standard deviation calculated from the data group including the newly collected analysis object data is compared with the numerical index extracted from the cell, and the difference therebetween is evaluated. As a result of the evaluation, if it is determined that the newly collected analysis object data is normal, the oldest numerical index in the cell is deleted, and the numerical index calculated from the newly collected analysis object data is newly added to the cell.

As the numerical index of the newly collected analysis object data, the value of the standard deviation itself of the analysis object data may be used, but, for example, an index based on Hotelling's theory may also be used. This theory is that, if the data represented by Equation 1 follows a normal distribution, H according to Equation 2 below follows a chi-square distribution.

$$H(x) = \frac{(x - \bar{x})^2}{\sigma^2} \quad \text{Equation 2}$$

Figures 6, 7:
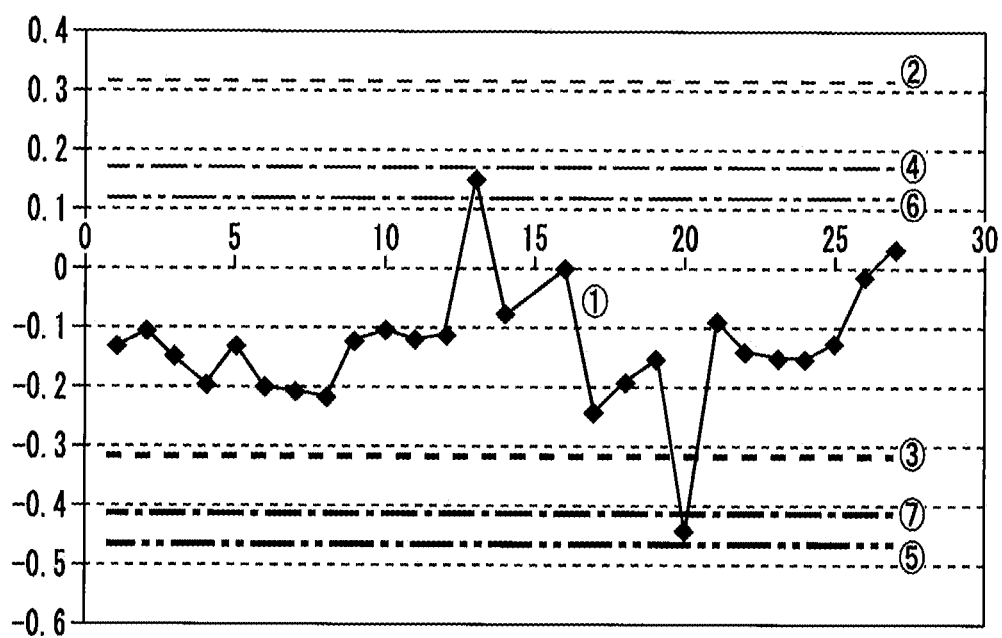
FIG. 6 is a table for explaining an example of a past data accumulation table according to the embodiment of the present disclosure.
FIG. 7 is a diagram for explaining a control chart according to the embodiment of the present disclosure.

In the example of the standard deviation described above, the past m standard deviations are stored as normal numerical indices in one cell stored in the table of FIG. 6. Assuming that they follow a normal distribution, the average x_ave and standard deviation σ of the past m numeric indices (standard deviations) in Equation 2 can be calculated. The standard deviation of the newly collected analysis object data is calculated as x in Equation 2. Note that H is a dimensionless value. The value of the chi-square distribution is generally shown in a numerical table, or can be calculated by the following Equation 3. Where k=1, y=H(x), and Γ is a gamma function.

$$f(y; k) = \frac{1}{2^{\frac{k}{2}} \Gamma\left(\frac{k}{2}\right)} y^{\frac{k}{2}-1} \exp\left(-\frac{y}{2}\right) \quad \text{Equation 3}$$

In the method using Hotelling's theory, an index H(x) based on Hotelling's theory is used as the numerical index, and is applied to the chi-square distribution to make the determination of normality/abnormality. It can be understood that H(x) becomes a large value and the abnormality degree increases when x is largely separated from the average x_ave and the standard deviation σ in Equation 2. For example, when H(x)=3.0, the chi-square distribution f=0.051, and the probability of H(x) being normal is about 5%. On the other hand, when H(x)=5.6, the chi-square distribution f=0.01, and the probability of H(x) being normal is about 1%. If normal data is treated as past data, it can be assumed that it follows a normal distribution.

As another determination method, a quality-control method based on a control chart will be described. FIG. 7 shows an example of the control chart. In the control chart, in general, a control upper limit and a control lower limit are set to 3σ (σ: standard deviation), and if they are exceeded, it is determined that an abnormality has occurred. For example, assuming that the m numerical indices accumulated in the table of FIG. 6 are kurtosis, it is possible to calculate σ of the numerical indices. If the kurtosis of the newly collected analysis object data exceeds 3σ in the case where the kurtosis as a normal numerical index is σ, the abnormality degree is 99.73%. The abnormality degree corresponding to a slightly lower control reference 2.5σ is 97.5%, and the abnormality degree corresponding to 2σ is 95.4%. Note that, the number 2 in 2σ, the number 3 in 3σ, etc. are dimensionless values.

However, when the skewness of the data is large, the kurtosis may be biased to the positive side or the negative side (in FIG. 7, it may be biased to the negative side). In such a case, the correction of the control upper limit and the control lower limit based on the skewness shown in "The Individuals Control Chart in Case of Non-Normality, Betul Kan, Berna Yazici, Anadolu University, Journal of Modern Applied Statistical Methods, Article 28 (2005)" is available. Equation 4 is an equation for the control upper limit UCL, Equation 5 is an equation for the control lower limit LCL, and $\beta_1$ in Equation 6 is the skewness.

$$UCL_{3\sigma}^{CMP} = \bar{x} + (3 + c)\sigma \quad \text{Equation 4}$$

$$LCL_{3\sigma}^{CMP} = \bar{x} + (-3 + c)\sigma \quad \text{Equation 5}$$

$$c = \frac{4}{3} \cdot \frac{\beta_1}{1 + 0.2\beta_1^2} \quad \text{Equation 6}$$

Yet another determination method will be described. In the table of FIG. 6, past m pieces of numerical indices accumulated in cells of the same steel type, the same strip thickness, and the same strip width as the newly collected analysis object data are taken out, and the average value thereof is calculated. Next, the difference between the average value of the past m pieces of numerical indices and the newly collected analysis object data is calculated. Then, yellow alarm is used if the difference is three times the standard deviation, a red alarm is used if it is four times the standard deviation, for example. However, the number of times may require trial and error in the field. Note that, the number 3 in three times, the number 4 in four times, etc, are dimensionless values.

3-2-2. Second Example of Analysis Method

As a second example of the analysis method, a description will be given of using the difference between a probability density distribution and a normal distribution of the deviation data. The probability density distribution represents a probability that the data x becomes a certain value in a certain range when the data x changes in the certain range, and when all the probabilities within the range are summed, it becomes 1 (100%).

FIG. 8 shows an example of the probability density distribution of normal data and an example of the probability density distribution of data containing abnormal data. Graph (a) in FIG. 8 illustrates the probability density distribution of only normal data, and graph (b) in FIG. 8 illustrates the probability density distribution of data including abnormal data. It is understood that the probability density distribution shown in graph (b) has a larger spread on the horizontal axis than the probability density distribution shown in graph (a), and has a larger degree of deviation from the normal distribution. Since the magnitude of the spread on the horizontal axis also appears in the magnitude of the standard deviation shown in the description of the above statistics, it appears in the numerical index of standard deviation. Here, the degree of deviation from the normal distribution is considered.

In order to quantitatively evaluate the degree of deviation from the normal distribution, for example, the following numerical indices can be used. Equation 7 is an equation for calculating Kullback-Leibler Divergence $D_{KL}$, Equation 8 is an equation for calculating the sum of squares of error $D_{SQ}$, and Equation 9 is an equation for calculating the sum of absolute values of error $D_{ABS}$.

$$D_{KL} = \sum_{x} P_N(x) \log \frac{P_N(x)}{P_A(x)} \quad \text{Equation 7}$$

$$D_{SQ} = \sum_{x} (P_N(x) - P_A(x))^2 \quad \text{Equation 8}$$

$$D_{ABS} = \sum_{x} |P_N(x) - P_A(x)| \quad \text{Equation 9}$$

Here, $P_A(x)$ is the actual distribution density of the original data x, and $P_N(x)$ is the normal probability density. The object data x is not absolute value data, but deviation data. The deviation data can be regarded as almost noise because it generates high frequency components strongly. In general, the noise consists of white noise mainly, and the distribution thereof is a normal distribution. However, when the original data includes a noise signal due to some abnormality, there is a high possibility that the deviation data has a distribution different from the normal distribution. The method is one intending to detect this matter.

In the same manner as in the above example of the standard deviation, for example, when Kullback-Leibler Divergence $D_{KL}$ is used as a numerical index, a table similar to the table shown in FIG. 6 is prepared and $D_{KL}$ calculated for normal data is stored. When new data comes in, $D_{KL}$ is calculated and compared with the previous m pieces of normal $D_{KL}$ to determine normality/abnormality. At this time, the determination methods of Hotelling's theory and the control chart described above can be used. The same applies to the case where the sum of squared error $D_{SQ}$ and the sum of absolute error $D_{ABS}$ are used. However, the numerical indices that can be used in the second example of the analysis method are not limited to these numerical indices $D_{KL}$, $D_{SQ}$, $D_{ABS}$. Further, as described as another determination method in the first example of the analysis method, the abnormality degree can be set manually and used for determination.

3-2-3. Third Example of Analysis Method

Figure 9:
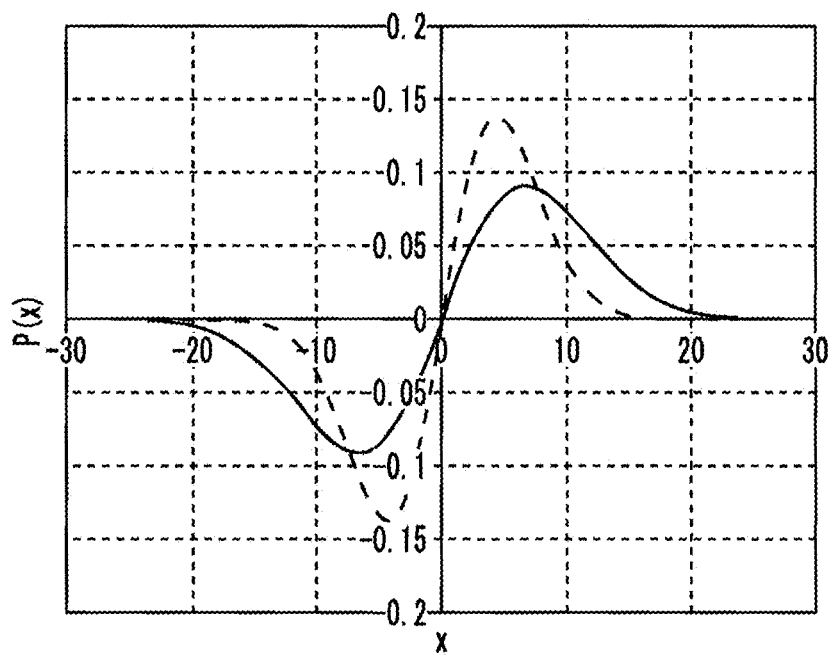
FIG. 9 is a diagram illustrating a probability density distribution, particularly Rayleigh distribution, according to the embodiment of the present disclosure.

As a third example of the analysis method, a method will be described in which the probability density distribution is calculated for each of a local maximum value and a local minimum value of the deviation data, and the difference from Rayleigh distribution is used as a numerical index. In the case of the local maximum value and the local minimum value, the distribution of the data in the normal state is not a normal distribution, but Rayleigh distribution as shown in FIG. 9. The calculation of the numerical index and the determination of normality/abnormality are the same as those described above. The value of the probability density is a dimensionless value.

3-2-4. Fourth Example of Analysis Method

As a fourth example of the analysis method, a method using an autoregression model will be described. In general, a regression model represents the relationship between a dependent variable and an independent variable in the form of, for example, a linear polynomial, and the dependent variable and the independent variable may be different variables. For example, in the case where the dependent variable is a rolling load, the regression model can be formed with a deformation resistance, a rolling speed, or a material temperature as the independent variable. In the autoregression model, the dependent variable and the independent variable have the same data type, but the dependent variable is a current value and the independent variable uses a past value. For example, this corresponds to identifying the rolling load by the value of the rolling load in the past. The autoregression model is represented by, for example, Equation 10 below. Where ε is white noise, $\alpha_0, \alpha_1, \ldots, \alpha_{K-1}$ are autoregressive coefficients. The values of the autoregression coefficients are dimensionless values.

$$y(m) = a_0 + a_1 y(1) + a_2 y(2) + \ldots + a_{m-1} y(m-1) + \varepsilon \quad \text{Equation 10}$$

Figure 10:
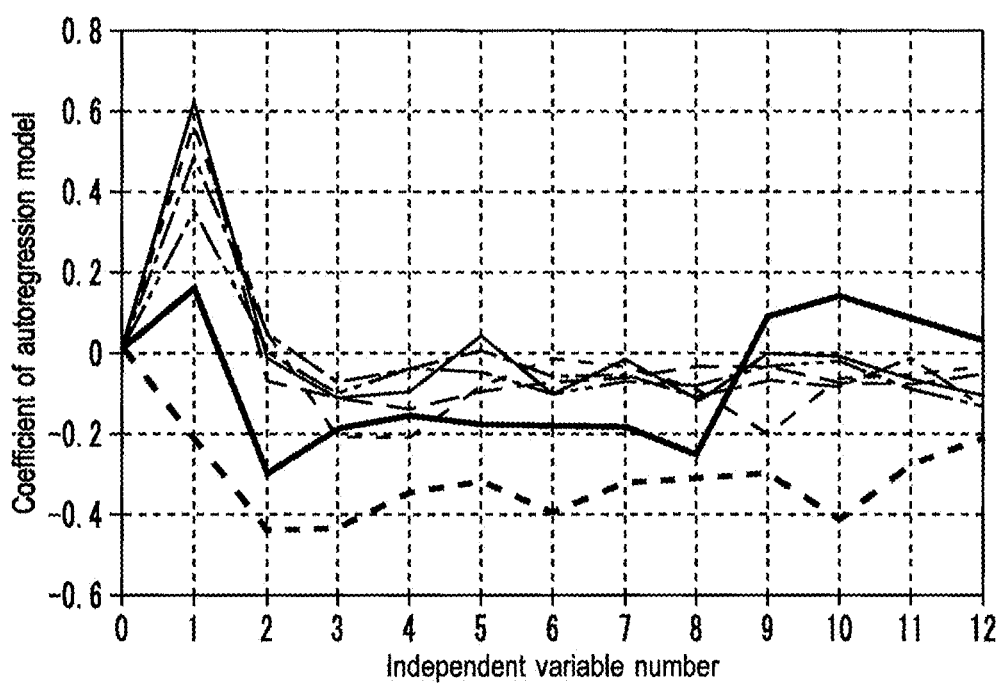
FIG. 10 is a diagram for explaining a change in the autoregression coefficient of an autoregression model according to the embodiment of the present disclosure.

FIG. 10 shows an example of the change in the autoregression coefficient of the autoregression model. In the drawing, the horizontal axis 0 indicates the value of the constant term $\alpha_0$, and the horizontal axis k (k is a natural number) indicates the value of the coefficient $\alpha_k$ of the value of k before. The vertical axis represents the value of the coefficient. The lines shown in FIG. 10 also include results of identification by the abnormal data. If the time of the identification object is constant (in this case, a fixed value of 12) and the normal data is the object, it is highly likely that the autoregression coefficient keeps a substantially constant value, but some of the lines in FIG. 10 move differently from other lines, which is due to the abnormal data. Therefore, when the value of the coefficient identified by the autoregression model is different from the value of the coefficient identified by the past normal data, it can be determined that any abnormality has occurred.

As in the other methods, a table as shown in FIG. 6 is prepared for storing coefficient values based on normal data corresponding to each coefficient. When new data comes in, the average value and the standard deviation of the past m pieces of coefficient values are calculated, and Equation 2 according to Hotelling's theory is calculated as a numerical index, for example. By applying this numerical index to the chi-square distribution, normality/abnormality can be determined. Alternatively, the normality/abnormality can be determined based on whether or not the newly calculated coefficient value exceeds the control upper limit or the control lower limit calculated based on the coefficient values of the past m pieces of normal data.

3-2-5. Other Examples of Analysis Method

In addition to the above examples, analysis methods such as FFT (Fast Fourier Transform) and wavelet transform are also available as analysis methods, and are not limited to the above examples.

Figure 11:
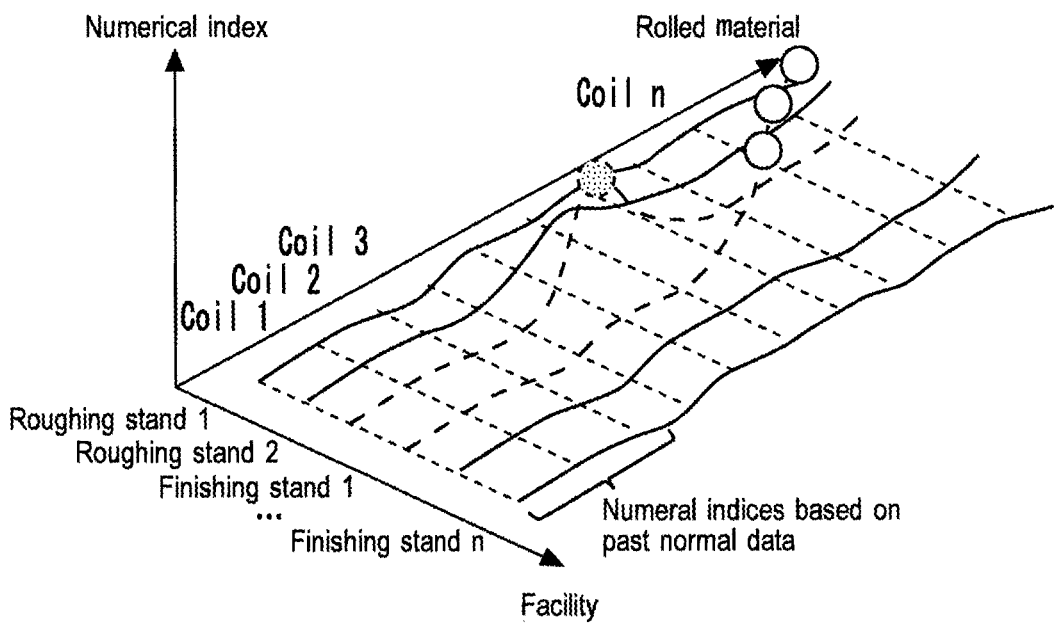
FIG. 11 is a diagram for explaining comparative for each similar facility according to the embodiment of the present disclosure.

In the above example of the analysis method, a numerical index based on past values of normal original data is calculated, next, a new numerical index based on newly added data is calculated based on the numerical index, and then, the new numerical index and the numerical index based on past values is compared. If there are a plurality of similar facilities, a numerical index based on data obtained from the similar facilities may be compared with a numerical index based on data obtained from an object facility to determine the normality/abnormality of the object facility. For example, in the three-axis graph of FIG. 11, the axial direction of the material to be rolled represents a temporal transition. Performing comparison in this axial direction corresponds to the method of comparison with the past m pieces of values described above. In the three-axis graph of FIG. 11, performing comparison in the axial direction of the facility can also be made. If the numerical index shows a behavior different from that of other facilities, it can be determined that any abnormality has occurred. The selection of the analysis method, the calculation method of the numerical index, and the determination of normality/abnormality are the same as those described above.

The numerical indices calculated by the primary determination unit 4 are summarized as follows. Although a threshold value is not applied to the numerical index itself, it is necessary to apply some threshold value to the numerical index to determine normality/abnormality.

Case 1: Statistic itself such as a standard deviation and a skewness
Case 2: Index of Hotelling's theory based on case 1
Case 3: Values of Equations 7 to 9 representing a difference between a probability density distribution of an original data and a normal distribution
Case 4: Index of Hotelling's theory based on case 3
Case 5: Values of Equations 7 to 9 representing a difference between a probability density distribution of a local maximum value and a local minimum value and Rayleigh distribution
Case 6: Index of Hotelling's theory based on case 5
Case 7: Value of an autoregression coefficient itself identified by an autoregression model
Case 8: Indicators of Hotelling' theory based on Case 7

As described above, the primary determination unit 4 calculates a numerical index for each analysis method with respect to each manufacturing facility and each product quality, and performs determination of normality/abnormality and calculation of an abnormality degree based on the numerical index.

3-3. Secondary Determination Unit

Next, the secondary determination unit 5 will be described.

3-3-1. First Example of Machine Learning Device

Figure 12:
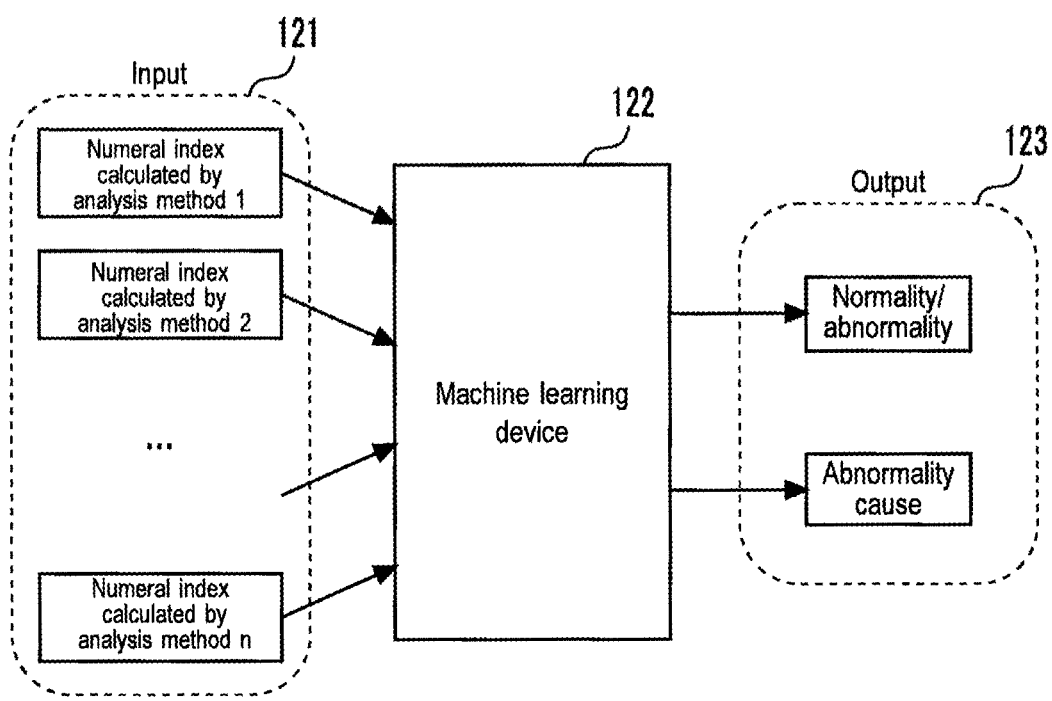
FIG. 12 is a diagram showing a first example of a machine learning device according to the embodiment of the present disclosure.

FIG. 12 is a diagram showing a first example of the machine learning device included in the secondary determination unit 5. In FIG. 12, a numerical index calculated in the primary determination unit is an input 121 to the machine learning device 122, and a set of a determination result of normality/abnormality (secondary determination result) and an estimated abnormality cause is an output 123. In the learning phase, a pair of the input 121 and the output 123 obtained from the input 121 is provided as a teacher signal to the machine learning device 122. In the stage of performing the secondary determination, only the input 121 is given to the machine learning device 122, and the output 123 is used as the determination result.

As described in the description regarding the primary determination unit 4, there are a plurality of types of analysis methods, and there are a plurality of numerical indices calculated therefrom. For this reason, even if the same object data is used, there is a possibility that the determination result of the normality/abnormality of the facility and the quality may be different in some cases. This means that the event to be analyzed differs depending on the analysis method and the determination result may differ depending on the boundary between normality and abnormality, that is, depending on how to set a threshold value to determine normality/abnormality.

In the learning function of the secondary determination unit 5, at the stage of learning, a plurality of numerical indices output by the primary determination unit 4 are set as the input 121. The machine learning device 122 includes, for example, learning by a neural network having one intermediate layer, deep learning by a neural network having a plurality of intermediate layers, or rule-based learning describing a causal relationship such as that the event A is caused by the cause C in the probability B. The output 123 indicates the determination result of normality/abnormality, and the estimated abnormality cause.

FIG. 13 shows an example of a learning mode in the machine learning device 122. The information input unit 6 lists cause candidates hierarchically as shown in the table of FIG. 13. The table shows the location of the facility, the abnormality cause-1 indicating the outline cause, and the abnormality cause-2 indicating the detailed cause as the cause candidates. Of course, the number of hierarchies is not limited to two. An editing function is provided so that a skill in art is able to newly input (after No. 13 in FIG. 13) or correct the cause. In addition, countermeasures against abnormalities may be entered in rightmost columns of blocks forming the table. Inputting information using the information input unit 6 is performed by a skill in art related to the object manufacturing facility such as a rolling mill, that is, an operator or an engineer having sufficient knowledge of the object manufacturing facility.

When a numerical index according to an analysis method for each manufacturing facility and each product quality is input from the primary determination unit 4, a skill in art associates the input numerical index with the abnormality cause-1 or further with the abnormality cause-2 by referring to the table of FIG. 13. The pair of the input numerical index and the abnormality cause-1 or the abnormality cause-2 is used as a teacher signal for learning the machine learning device 122.

Figure 14:
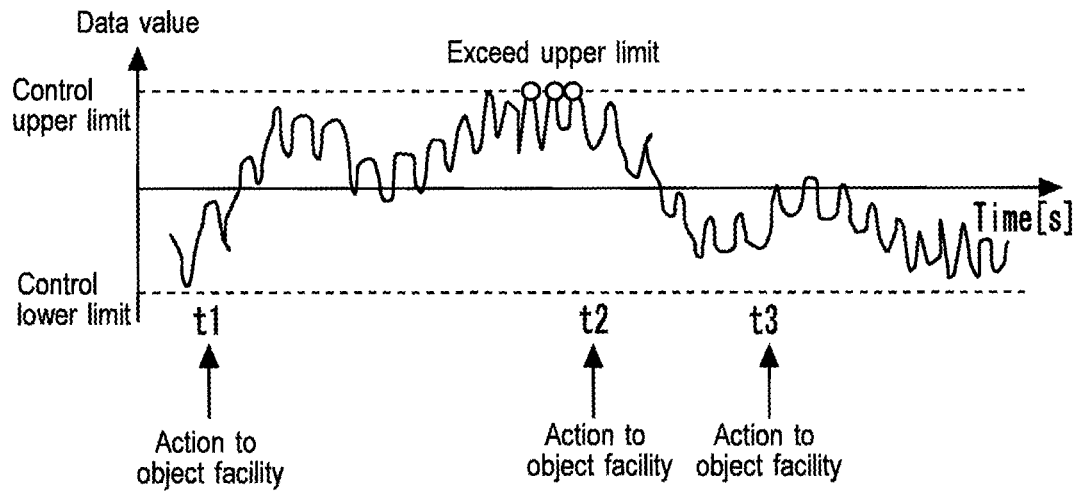
FIG. 14 is a diagram for explaining movement of object manufacturing facility data and artificial action.

Also, artificial changes to the manufacturing facility or the product quality can be captured, and associated with numerical indices in accordance with analytical methods. FIG. 14 is a control chart showing a state in which the data of a certain object manufacturing facility changes in time, and the relationship with an artificial action is shown in the control chart. When an artificial action is performed to the object manufacturing facility at time t1, the data starts to move toward the abnormal value in the positive direction. After being informed that the numerical index has exceeded the control upper limit three times by the primary determination unit 4, a skill in art performs one action at time t2, and performs another action at time t3 again. In this case, there is a high possibility that the action performed at the time t1 is the cause of the abnormality, and it is considered that the action performed at the time t2 is the countermeasure to remove the abnormality. The action performed at the time t3 has little effect.

As a result, the input 121 at the time of learning by the machine learning device 122 is the facility and the quality when the numerical index exceeds the control upper limit three times, and the value of the numerical index at that time. The teacher signal is the abnormality cause-1 and the abnormality cause-2 corresponding to the time t1 or the time t2 at which actions are performed in FIG. 13. A skill in art generally describes these actions in an operation diary. The operation diary may be a paper operation diary or an electronic operation diary. In the case of the electronic operation diary, those actions can be incorporated into the system relatively easily. In the case of the paper operation diary, descriptions therein need to be converted into electronic information.

3-3-2. Second Example of Machine Learning Device

Figure 15:
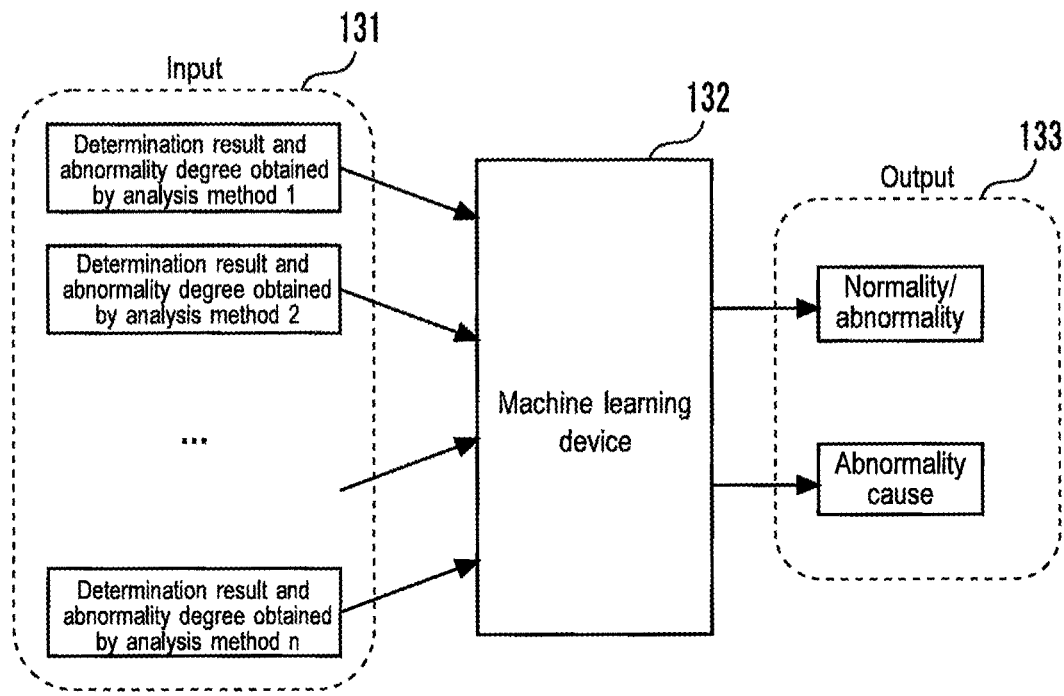
FIG. 15 is a diagram showing a second example of the machine learning device according to the embodiment of the present disclosure.

FIG. 15 is a diagram showing a second example of the machine learning device included in the secondary determination unit 5. Unlike the first example shown in FIG. 12, in the machine learning device 132 of the second example, the input 131 from the primary determination unit 4 is not a numerical index, but a determination result of normality/ abnormality and an abnormality degree. The first example and the second example are different in input, but are the same except for it. However, in the case where the input 131 from the primary determination unit 4 is the determination result of normality/abnormality instead of the numerical index, if the threshold value used for the determination of normality/abnormality in the primary determination unit 4 is changed, the determination result of normality/abnormality may be greatly changed. Then learning has to be performed again from the beginning.

Therefore, in the machine learning device 132 of the second example shown in FIG. 15, learning is performed by increasing the weight for the abnormality degree in accordance with the determination result of normality/abnormality by the primary determination unit 4. For example, when Equation 2, which is an index of Hotelling's theory, is used, the value of the chi-square distribution corresponds to the abnormality degree. When H(x)=3.0, since the chi-square distribution has a value of 0.051, the probability of being normal is 0.051, that is, the probability of being abnormal is 0.949, and the abnormality degree is set to 0.949. In this manner, the output 133 from the machine learning device 132 is not affected by the change of the threshold value set by the primary determination unit 4. Which of the first example shown in FIG. 12 and the second example shown in FIG. 15 is more suitable for the object manufacturing facility can be determined while observing the respective performances in the adjustment stage.

3-3-3. Third Example of Machine Learning Device

In general, the number and type of abnormal data is much less than the number and type of normal data, and it generally takes a long time to collect cases indicating the abnormality. That is, in order for the machine learning device 122 of the first example shown in FIG. 12 and the machine learning device 132 of the second example shown in FIG. 15 to be learned, there is a problem that the frequency of obtaining a teacher signal in which an input including an abnormal state and a correct answer are paired is low, and it takes a long time to have a sufficient learning ability.

Figure 16:
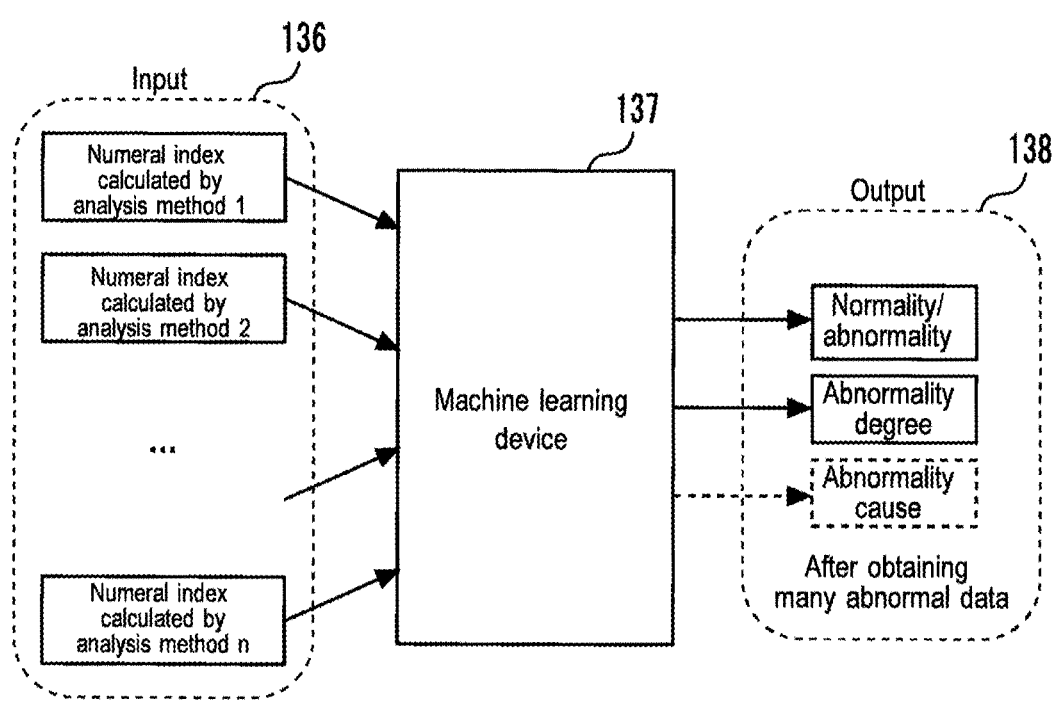
FIG. 16 is a diagram showing a third example of the machine learning device according to the embodiment of the present disclosure.

When there are few cases of abnormality, the machine learning device 137 of the third example shown in FIG. 16 is used. In the stage of learning by the machine learning device 137 of the third example, a teacher signal is used in which a plurality of numerical indices output from the primary determination unit 4 are used as an input, and the determination result of normality/abnormality and the abnormality degree output from the primary determination unit 4 are used as a correct answer. In the stage of extracting the learning result, a plurality of numerical indices from the primary determination unit 4 are extracted as an input 136, and the determination result of normality/abnormality and the abnormality degree are extracted as an output 138.

The machine learning device 137 learned in a stage in which there are few abnormal cases has normal data as a main input and is featured by determining the normality rather than the determining the abnormality. If abnormal data is input therein, it is determined as abnormal because it is different from the normal data. When the number of abnormal cases increases, the machine learning is more advanced by inserting the input/output relationship as described with reference to FIGS. 12 and 15 into the teacher signal and performing learning.

3-3-4. Transition Learning of Machine Learning Device

Transition learning in machine learning can be applied as a countermeasure for the case where there is little abnormal data. In general, transition learning is a method used when learning data has not yet been sufficiently accumulated in machine learning, and a result of learning (a result of machine learning, for example, a coupling weight within a neural network) in another place or another opportunity is used for the machine learning. When much abnormal data is obtained in another manufacturing facility, as a result of machine learning, it is possible to transfer to the object manufacturing facility in which there is little abnormal data. However, when the characteristics are different between the object manufacturing facility and another manufacturing facility, the difference must be appropriately evaluated to reduce the difference.

For example, it is assumed that a large amount of learning results accumulated in the manufacturing facility A is transferred to the manufacturing facility B in which a learning result is not accumulated. When the original data group X represented by Equation 1 is obtained in the manufacturing facility A, the feature of the manufacturing facility A is reflected strongly in the original data group X. For example, when the manufacturing facility A is a factory that produces larger amount than the manufacturing facility B and rolls more hard steel than the manufacturing facility B, the rated capacity of the electric motor of the manufacturing facility A is usually larger than that of the manufacturing facility B. All of the values such as the motor current obtained in the manufacturing facility A are large. When they are directly used to perform machine learning, the learning results are often not suitable for the manufacturing facility B even if they can be used for the manufacturing facility A.

One countermeasure against the above problem is of using the original data, which is a physical quantity, after normalizing it for input and output as a teacher signal of machine learning. As the normalizing method, there are a method of calculating the average and the standard deviation of the original data and correcting the input/output so that the average becomes 0 and the standard deviation becomes 1, and a method of calculating the maximum value and the minimum value of the original data and correcting the input/output so that the range between the maximum value and the minimum value becomes 1. However, in the case of the data of the manufacturing facility B in which there is little abnormal data, the distribution range of the original data is narrow, and the characteristic of the manufacturing facility B may not be sufficiently represented by normalization.

Therefore, in the machine learning according to the present embodiment, the original data obtained from the manufacturing facility is not directly used for learning, but learning is performed using dimensionless variables. In the primary determination unit 4, numerical indices are calculated using past normal data. Among the numerical indices, for example, the shape factor, the crest factor, the impulse factor, the skewness, the kurtosis, the value obtained by evaluating the difference between the probability density distribution and the normal distribution using Equations 7 to 9, and the values obtained by calculating all the basic statistics and the difference between the probability density distribution and the normal distribution by using the indices of Hotelling's theory, are dimensionless values, and therefore learning is performed using these values. This makes it easier to perform transfer learning because the result of learning at the manufacturing facility A can be directly transferred to the manufacturing facility B and further to other manufacturing facilities without being corrected. In other words, a small amount of abnormal data can be effectively and easily used in each manufacturing facility.

4. Data and Result Storage Unit and Display Unit

Returning to FIG. 2 again, the data and result storage unit 7 and the display unit 8 will be described. The data and result storage unit 7 stores the analysis object data prepared by the analysis object data preparation unit 3, the determination progress and result by the primary determination unit 4, and the determination progress and result by the secondary determination unit 5 in a storage device such as a hard disk. Storing the above data and results is done in order to extract the reason and the basis of the determination later.

Figure 17:
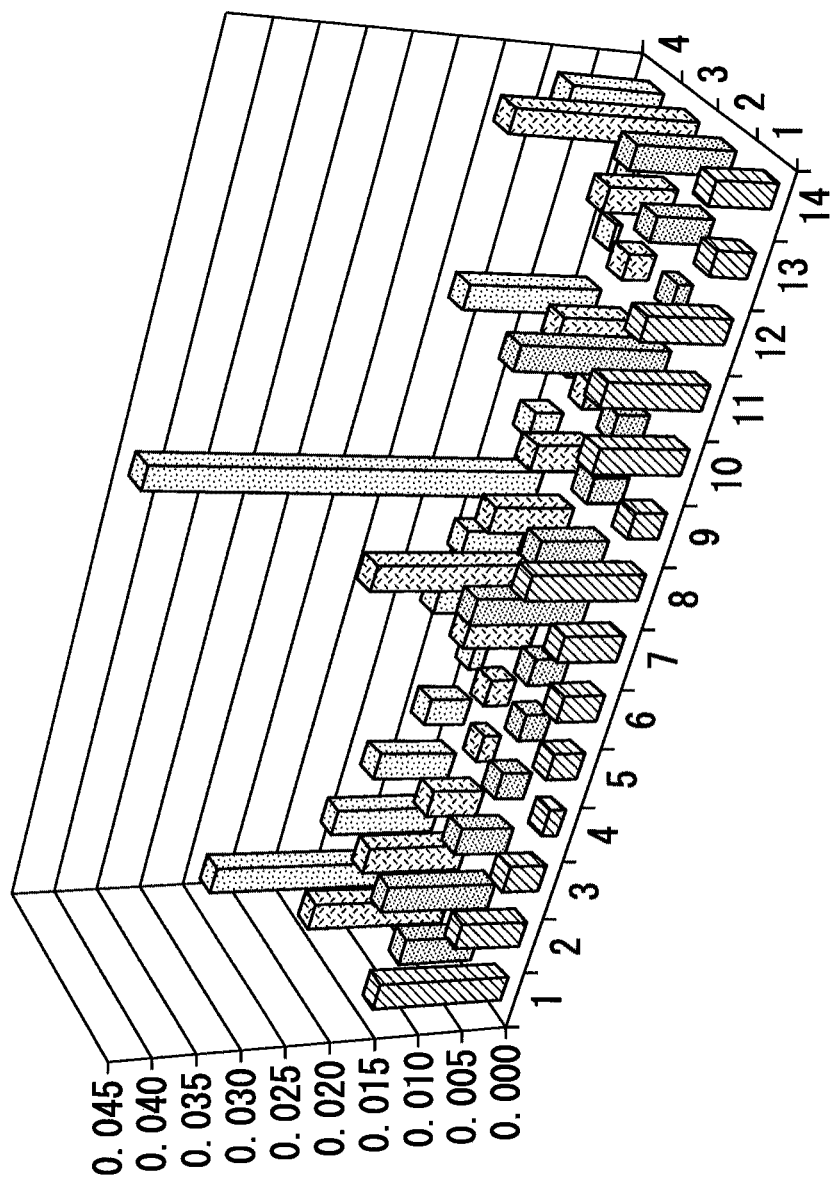
FIG. 17 is a diagram showing an example of a display according to the embodiment of the present disclosure.

The display unit 8 visually displays the time-series signal obtained from the manufacturing facility, the time-series signal representing the product quality, the analysis object data prepared by the analysis object data preparation unit 3, the determination progress and result by the primary determination unit 4, and the determination progress and result by the secondary determination unit 5. For example, the graph shown in FIG. 17 is an example in which fourteen numeral indices of Kullback-Leibler Divergence are calculated with respect to data of four materials-to-be-rolled, and the transition is plotted three-dimensionally. In this figure, the eighth index of the fourth material-to-be-rolled is the largest among the group, and it turns out that it is necessary to focus attention on this numerical index.

Even if the primary determination unit 4 and the secondary determination unit 5 make the determination of normality/abnormality, the data and result storage unit 7 and the display unit 8 are necessary to indicate the reason.

REFERENCE SIGNS LIST

1: Data collection apparatus
2: Abnormality determination support apparatus
3: Analysis object data preparation unit
4: Primary determination unit
5: Secondary determination unit
6: Information input unit
7: Data and result storage unit
8: Display unit
20: Manufacturing facility
122, 132, 137: Machine learning device

The invention claimed is:

1. An abnormality determination support apparatus that provides determination information for determining whether an abnormality has occurred in a manufacturing facility, comprising:
circuitry configured to
acquire a time-series signal representing at least one of a state of the manufacturing facility and a product quality from a data collection apparatus of the manufacturing facility, and extract analysis object data from the time-series signal,
perform a primary determination process which derives a plurality of primary determination results from common analysis object data by applying a plurality of different types of analysis methods to the analysis object data, and
perform a secondary determination process including machine learning process which is learned using a teacher signal which is a pair of a primary determination result obtained by the primary determination process and a set of an abnormality determination result and an abnormality cause corresponding to the primary detection result as a set of correct answers, and the secondary determination process inputs the plurality of primary determination results obtained from the common analysis object data by the primary determination process to the machine learning process, and outputs a secondary determination result and an estimated abnormality cause output from the machine learning process as the determination information.

2. The abnormality determination support apparatus according to claim 1,
wherein the primary determination process includes converting the analysis object data into a plurality of numerical indices by applying the plurality of different types of analysis methods to the analysis object data, and output the plurality of numerical indices as the plurality of primary determination results,
wherein the machine learning process includes learning using the teacher signal including a numerical index obtained by the primary determination process as an input and including an actual abnormality determination result and an abnormality cause as the correct answer, and
wherein the secondary determination process includes inputting the plurality of numerical indices obtained for each analysis method by the primary determination process to the machine learning process, and output the abnormality determination result and the estimated abnormality cause output from the machine learning process as the determination information.

3. The abnormality determination support apparatus according to claim 1,
wherein the primary determination process includes converting the analysis object data into a plurality of numerical indices by applying a plurality of different types of analysis methods to the analysis object data, perform determination of presence or absence of an abnormality and calculation of an abnormality degree based on each of the plurality of numerical indices, and output a plurality of determination results and abnormality degrees obtained for each analysis method as a plurality of primary determination results,
wherein the machine learning process includes learning using the teacher signal including the determination result and the abnormality, degree obtained by the primary determination process as an input and including an actual abnormality determination result and an abnormality cause as the correct answer, and
wherein the secondary determination process includes inputting the plurality of determination results and abnormality degrees obtained for each analysis method by the primary determination process to the machine learning process, and outputting the abnormality determination result and the estimated abnormality cause output from the machine learning process as the determination information.

4. The abnormality determination support apparatus according to claim 1,
wherein the primary determination process includes converting the analysis object data into a plurality of numerical indices by applying the plurality of different types of analysis methods to the analysis object data, and output the plurality of numerical indices as the plurality of primary determination results,
wherein the machine learning process includes using the teacher signal including a numerical index obtained by the primary determination process as an input and including presence or absence of an abnormality determined from the numerical index and an abnormality degree calculated from the numerical index as the correct answer, and wherein the secondary determination process includes inputting the plurality of numerical indices obtained for each analysis method by the primary determination process to the machine learning process, and outputting the abnormality determination result and the estimated abnormality cause output from the machine learning process as the determination information.

5. The abnormality determination support apparatus according to claim 1,
wherein the circuitry is configured to extract data in two states of a loaded state and an unloaded state of the manufacturing facility while the manufacturing facility is in operation, and calculate a high-frequency component obtained by removing a low-frequency component from the extracted data as the analysis object data.

6. The abnormality determination support apparatus according to claim 5,
wherein the primary determination process includes converting the analysis object data into a plurality of numerical indices by applying the plurality of different analysis methods to the analysis object data in each of the loaded state and the unloaded state, determining the presence or absence of the abnormality based on each of the plurality of numerical indices, determining that there is an abnormality in a mechanical system if the loaded state is an abnormal state and the unloaded state is a normal state, and determining that there is an abnormality in any one of an electrical system, a signal transmission system, and a control system if both the loaded state and the unloaded state are abnormal states.

7. The abnormality determination support apparatus according to claim 1,
wherein the circuitry is configured to extract data in two states of a sensor for measuring product quality, which are a state during measurement and a state of measurement waiting, during operation of the manufacturing facility, and calculate a high-frequency component obtained by removing a low-frequency component from the extracted data as the analysis object data.

8. The abnormality determination support apparatus according to claim 6,
wherein the primary determination process includes converting the analysis object data into a plurality of numerical indices by applying a plurality of different analysis methods to the analysis object data in each of the state during measurement and the state of measurement waiting, determining the presence or absence of an abnormality based on each of the plurality of numerical indices, determining that there is an abnormality in the product quality if the state of measurement is an abnormal state and the state of measurement waiting is a normal state, and determining that there is an abnormality in a sensor system that measures the product quality or a signal transmission system if both the state during measurement and the state of measurement waiting are abnormal states.

9. The abnormality determination support apparatus according to claim 1,
wherein the machine learning process includes learning by any one of learning by a neural network having one intermediate layer, deep learning by a neural network having a plurality of intermediate layers, and rule-based learning.

10. The abnormality determination support apparatus according to claim 1,
wherein the machine learning process includes setting a dimensionless variable having no physical unit among the variables indicating the primary determination result obtained by the primary determination process a learning object, and the dimensionless variable is applied to transition learning to an abnormality determination support apparatus of another manufacturing facility or transition learning from the abnormality determination support apparatus of another manufacturing facility.

11. The abnormality determination support apparatus according to claim 1,
wherein the circuitry is configured to store at least one of the analysis object data, determination progress and result by the primary determination process, and determination progress and result by the secondary determination process.

12. The abnormality determination support apparatus according to claim 1, further comprising a display monitor,
wherein the at least one program causes the circuitry to visually display on the display monitor at least one of the time-series signal obtained from the data collection apparatus, the analysis object data, determination progress and result by the primary determination process, and determination progress and result by the secondary determination process.

13. A method for determining whether an abnormality has occurred in a manufacturing facility, the method comprising:
acquiring a time-series signal representing at least one of a state of the manufacturing facility and a product quality from a data collection apparatus of the manufacturing facility, and extract analysis object data from the time-series signal;
deriving a plurality of primary determination results from common analysis object data by applying a plurality of different types of analysis methods to the analysis object data; and
performing a process including machine learning using a teacher signal which is a pair of a primary determination result obtained by deriving and a set of an abnormality determination result and an abnormality cause corresponding to the primary detection result as a set of correct answers by inputting the plurality of primary determination results obtained from the common analysis object data by the deriving to the machine learning, and outputting a secondary determination result and an estimated abnormality cause output from the machine learning as the determination information.

14. The method according to claim 13,
wherein deriving includes converting the analysis object data into a plurality of numerical indices by applying the plurality of different types of analysis methods to the analysis object data, and outputting the plurality of numerical indices as the plurality of primary determination results,
wherein the machine learning uses the teacher signal including a numerical index obtained by the converting as an input and including an actual abnormality determination result and an abnormality cause as the correct answer, and
wherein processing includes inputting the plurality of numerical indices obtained for each analysis method to the machine learning, and outputting the abnormality determination result and the estimated abnormality cause output from the machine learning as the determination information.

15. The method according to claim 13,
wherein deriving includes converting the analysis object data into a plurality of numerical indices by applying a plurality of different types of analysis methods to the analysis object data, determining presence or absence of an abnormality and calculation of an abnormality degree based on each of the plurality of numerical indices, and outputting a plurality of determination results and abnormality degrees obtained for each analysis method as the plurality of primary determination results, wherein the machine learning includes learning using the teacher signal including the determination result and the abnormality degree as an input and including an actual abnormality determination result and an abnormality cause as the correct answer, and wherein processing includes inputting the plurality of determination results and abnormality degrees obtained for each analysis method to the machine learning, and outputting the abnormality determination result and the estimated abnormality cause output from the machine learning as the determination information.

16. The method according to claim 13, wherein deriving includes converting the analysis object data into a plurality of numerical indices by applying the plurality of different types of analysis methods to the analysis object data, and outputting the plurality of numerical indices as the plurality of primary determination results, wherein the machine learning includes learning using the teacher signal including a numerical index obtained by the converting as an input and including presence or absence of an abnormality determined from the numerical index and an abnormality degree calculated from the numerical index as the correct answer, and wherein processing includes inputting the plurality of numerical indices obtained for each analysis method to the machine learning, and outputting the abnormality determination result and the estimated abnormality cause output from the machine learning as the determination information.

17. The method according to claim 13, further comprising:

extracting data in two states of a sensor for measuring product quality, which are a state during measurement and a state of measurement waiting, during operation of the manufacturing facility; and calculating a high-frequency component obtained by removing a low-frequency component from the extracted data as the analysis object data.

18. The method according to claim 13, wherein the machine learning includes learning by any one of learning by a neural network having one intermediate layer, deep learning by a neural network having a plurality of intermediate layers, and rule-based learning.

19. The method according to claim 13, wherein the machine learning includes setting a dimensionless variable having no physical unit among the variables indicating the primary determination result obtained by the deriving as a learning object, and applying the dimensionless variable to transition learning to another manufacturing facility or transition learning from another manufacturing facility.

20. The method according to claim 13, further comprising storing at least one of the analysis object data, determination progress and result by the deriving, and determination progress and result by the processing.

* * * * *